(12) United States Patent
Hiruta et al.

(10) Patent No.: US 11,907,856 B2
(45) Date of Patent: Feb. 20, 2024

(54) DETERMINING AN OPERATING ENVELOPE FOR CONTROLLING EQUIPMENT

(71) Applicant: HITACHI, LTD., Tokyo (JP)

(72) Inventors: Tomoaki Hiruta, Santa Clara, CA (US); Chetan Gupta, Santa Clara, CA (US); Ahmed Khairy Farahat, Santa Clara, CA (US); Kosta Ristovski, Santa Clara, CA (US)

(73) Assignee: HITACHI, LTD., Tokyo (JP)

(*) Notice: Subject to any disclaimer, the term of this patent is extended or adjusted under 35 U.S.C. 154(b) by 1155 days.

(21) Appl. No.: 16/332,106

(22) PCT Filed: May 26, 2017

(86) PCT No.: PCT/US2017/034602
§ 371 (c)(1),
(2) Date: Mar. 11, 2019

(87) PCT Pub. No.: WO2018/217209
PCT Pub. Date: Nov. 29, 2018

(65) Prior Publication Data
US 2019/0370668 A1    Dec. 5, 2019

(51) Int. Cl.
*G06N 5/01* (2023.01)
*G06N 20/00* (2019.01)
(Continued)

(52) U.S. Cl.
CPC ............ *G06N 5/01* (2023.01); *G05B 23/0248* (2013.01); *G06F 11/0757* (2013.01); *G06N 20/00* (2019.01); *G06Q 10/20* (2013.01)

(58) Field of Classification Search
USPC ........................................................ 706/904
See application file for complete search history.

(56) References Cited

U.S. PATENT DOCUMENTS 6,453,430 B1    9/2002  Singh et al.
2005/0246361 A1   11/2005  Tuv
(Continued)

FOREIGN PATENT DOCUMENTS

WO    WO-2015037118 A1 *  3/2015    ........... G05B 19/418

OTHER PUBLICATIONS

D.M. Louit, R. Pascual, A.K.S. Jardine, A practical procedure for the selection of time-to-failure models based on the assessment of trends in maintenance data, Reliability Engineering & System Safety, vol. 94, Issue 10, 2009, pp. 1618-1628, ISSN 0951-8320 (Year: 2009).*

(Continued)

*Primary Examiner* — Michael Young
(74) *Attorney, Agent, or Firm* — Mattingly & Malur, PC

(57) ABSTRACT

In some examples, a computer system may receive sensor data and failure data for equipment. The system may determine, for the equipment, a plurality of time between failure (TBF) durations that are longer than other TBF durations for the equipment. The system may determine, from the sensor data corresponding to operation of the equipment during the plurality of TBF durations, a plurality of measured sensor values for the equipment. Additionally, the system may determine a subset of the measured sensor values corresponding to a largest number of the TBF durations of the plurality of TBF durations. The system may further determine at least one operating parameter value for the equipment based on the subset of the measured sensor values. The system may send a control signal for operating the equipment based on the operating parameter value and/or a communication based on the operating parameter value.

13 Claims, 11 Drawing Sheets

(51) Int. Cl.
*G06F 11/07* (2006.01)
*G06Q 10/20* (2023.01)
*G05B 23/02* (2006.01)

(56) References Cited

U.S. PATENT DOCUMENTS

| | | | |
|---|---|---|---|
| 2009/0210081 A1* | 8/2009 | Sustaeta | H04L 67/125 |
| | | | 715/702 |
| 2016/0140515 A1* | 5/2016 | Katsumata | G06Q 10/20 |
| | | | 705/7.25 |
| 2016/0217379 A1 | 7/2016 | Patri et al. | |
| 2016/0292652 A1 | 10/2016 | Bowden, Jr. et al. | |
| 2016/0294630 A1* | 10/2016 | Verma | H04L 41/12 |
| 2017/0031329 A1 | 2/2017 | Inagaki et al. | |

OTHER PUBLICATIONS

International Search Report of PCT/US2017/034602 dated Aug. 7, 2017.

\* cited by examiner

| Equipment ID | Timestamp | First Sensor | ... | Nth Sensor |
|---|---|---|---|---|
| E001 | 2016-09-28 00:00 | 100 | ... | 200 |
| E001 | 2016-09-28 00:01 | 101 | ... | 199 |
| ... | ... | ... | ... | ... |
| E002 | 2016-09-01 00:00 | 150 | ... | 300 |
| E002 | 2016-09-01 00:01 | 151 | ... | 301 |
| ... | ... | ... | ... | ... |

FIG. 2

| | Equipment ID ↗302 | Start Time ↗304 | End Time ↗306 | Failure Code ↗308 |
|---|---|---|---|---|
| 310 | E001 | 2016-09-11 10:00 | 2016-09-12 10:00 | F01 |
| 312 | E001 | 2016-09-19 10:00 | 2016-09-19 18:00 | F01 |
| 314 | E001 | 2016-09-29 18:00 | 2016-09-30 01:00 | F02 |
| | ... | ... | ... | ... |
| 316 | E002 | 2016-09-20 00:00 | 2016-09-20 04:00 | F01 |
| | ... | ... | ... | ... |

FIG. 3

| Equipment Operating Parameter Value | Score (R) |
|---|---|
| Sensor A value < 40 | 0 |
| 40 ≤ Sensor A value < 100 | 6 |
| 100 ≤ Sensor A value < 150 | 105 |
| Sensor A value ≥ 150 | 4 |

FIG. 9

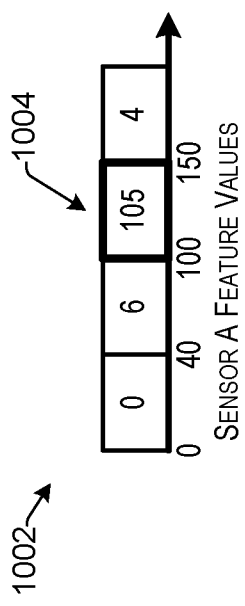

FIG. 11A

| SENSOR A FEATURE VALUE ($VALUE_{SA}$) | SENSOR B FEATURE VALUE ($VALUE_{SB}$) | | |
|---|---|---|---|
| | (-20)-30 | 30-50 | 50+ |
| 0-40 | 0 | 0 | 0 |
| 40-100 | 1 | 3 | 2 |
| 100-150 | 4 | 94 | 7 |
| 150+ | 0.0 | 3 | 1 |

FIG. 11B

| MAXIMUM DEPTH | SCORE (R) | INCREASED TBF RATE | OPERATING PARAMETER VALUES |
|---|---|---|---|
| 1 | 105 | 21% | $100 \leq VALUE_{SA} < 150$ |
| 2 | 94 | 32% | $100 \leq VALUE_{SA} < 150$; $30 \leq VALUE_{SB} < 50$ |
| 3 | 67 | 51% | $100 \leq VALUE_{SA} < 150$; $30 \leq VALUE_{SB} < 50$; $0 \leq VALUE_{SC} < 10$ |
| ... | ... | ... | ... |

DETERMINING AN OPERATING ENVELOPE FOR CONTROLLING EQUIPMENT

TECHNICAL FIELD

This disclosure relates to the technical field of controlling equipment to reduce the occurrence of equipment failure.

BACKGROUND

Equipment may sometimes be subject to failure, which may result in loss of production, repair of the equipment, replacement of parts, or other sometimes costly expenses. Preventive maintenance may be performed on equipment to keep the equipment in an operational, efficient, and cost-effective condition while preventing failure of the equipment. The maintenance process may include performing one or more actions on the equipment, such as based on a schedule, to maintain the equipment in an operational state. However, if a piece of equipment is operated in a manner that is not optimal for the equipment, failure may still occur with unnecessary frequency despite regular maintenance.

SUMMARY

Some implementations include a computer system that may receive sensor data and failure data for equipment. The system may determine, for the equipment, a plurality of time between failure (TBF) durations that are longer than other TBF durations for the equipment. The system may determine, from the sensor data corresponding to operation of the equipment during the plurality of TBF durations, a plurality of measured sensor values for the equipment. Additionally, the system may determine a subset of the measured sensor values corresponding to a largest number of the TBF durations of the plurality of TBF durations. The system may further determine at least one operating parameter value for the equipment based on the subset of the measured sensor values. The system may send a control signal for operating the equipment based on the operating parameter value and/or may send a communication based on the operating parameter value.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example data structure representative of historical sensor data according to some implementations.

FIG. 3 illustrates an example data structure representative of historical failure occurrences according to some implementations.

FIG. 9 illustrates an example data structure that summarizes the results of the decision tree for determining an operating parameter value for a prescribed operating envelope according to some implementations.

FIG. 10A illustrates an example data structure indicating results for a single sensor variable according to some implementations.

FIG. 10B illustrates an example data structure indicating a prescribed operating envelope according to some implementations.

FIG. 11A illustrates an example data structure indicating results for two sensor variables according to some implementations.

FIG. 11B illustrates an example data structure indicating a prescribed operating envelope according to some implementations.

DESCRIPTION OF THE EMBODIMENTS

Figure 1:
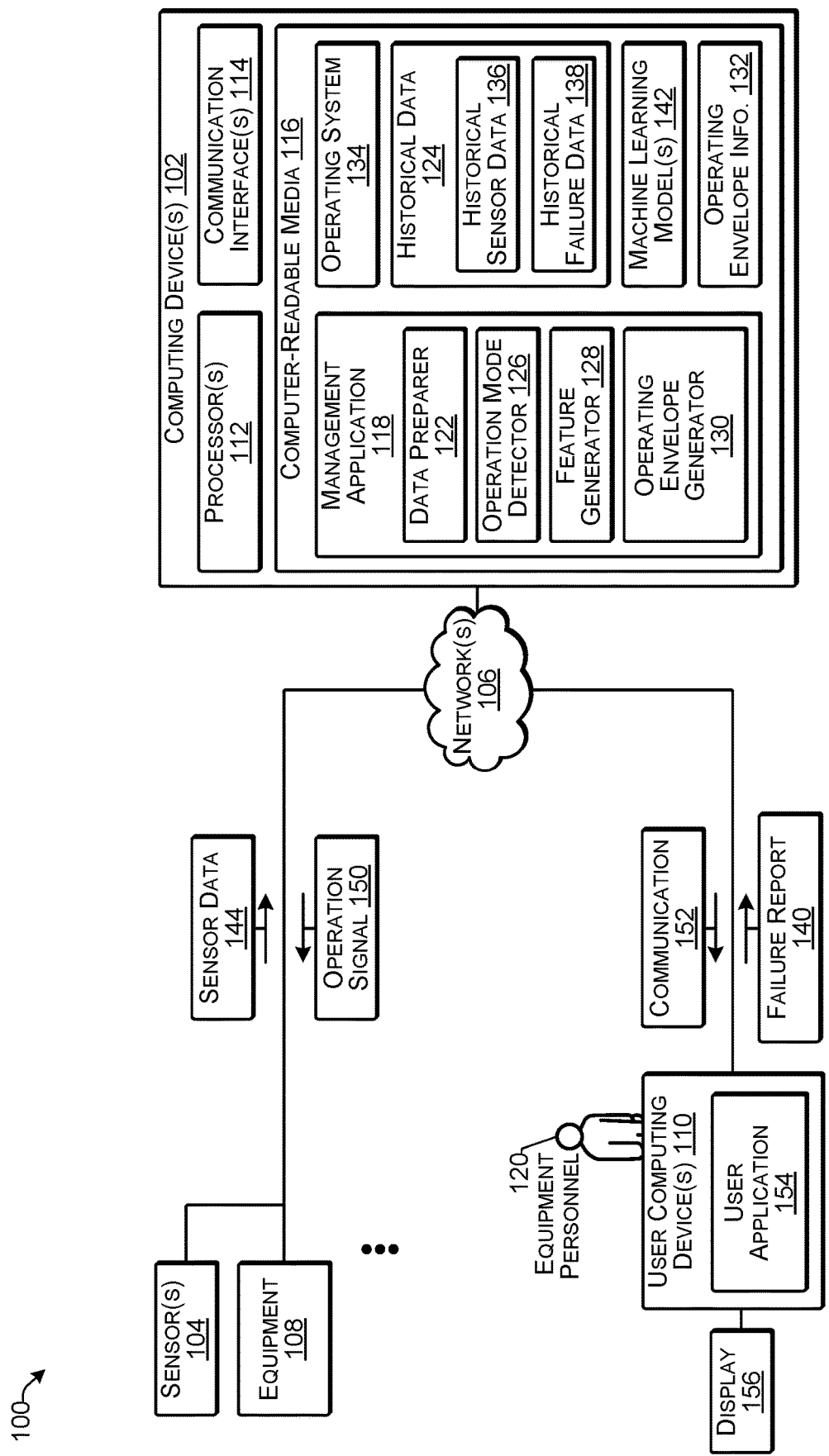
FIG. 1 illustrates an example architecture of a system according to some implementations able to control equipment based on a prescribed operating envelope and/or provide a recommendation or other communication based on the prescribed operating envelope.

Some implementations herein are directed to techniques and arrangements for operating equipment within an operation envelope. For example, implementations herein may determine a prescribed operating envelope for the equipment and may control the equipment to operate within the prescribed operating envelope for increasing the amount of time between occurrences of failure of the equipment. In some cases, the operating envelope may include one or more operating parameter values, such as a range of operating parameter values that are selected for reducing frequency of failure while also achieving operational targets. Some examples herein may employ historical sensor data and historical failure data, which may include a determined time between occurrences of past failures and corresponding values of the sensors. The historical sensor data and failure data may be employed with machine learning technology for determining an operating envelope for a particular piece of equipment.

As one example, by determining the time between occurrences of failure occurs and measured sensor values of the equipment obtained from sensor data during the duration of time between failures, the machine learning technology herein may learn specific operating conditions such that the time between failures may be increased. In some cases, the equipment may be controlled directly by the system to operate within a prescribed operating envelope. In other examples, the prescribed operating envelope may be provided to an equipment operator or other equipment personnel who may configure the equipment to operate within the prescribed operation envelope. In either event, by operating the equipment within the prescribed operation envelope, the failure rate of the equipment may be decreased.

In some implementations, at least one computing device may receive sensor data from the equipment in the field, such as through a network connection or a direct connection.

The computing device may further receive failure reports from equipment personnel, from the equipment itself, and/or from another computing device associated with the equipment. The computing device may store the received sensor data and the failure report data, and may use machine learning techniques to analyze the data to determine an optimal operating envelope for the equipment that reduces the frequency of failure of the equipment. In some cases, the computing device may control the equipment directly to operate the equipment within the prescribed operating parameter(s) of the operating envelope. In other examples, the computing device may send the prescribed operating envelope parameters to another computing device, such as to cause the other computing device to apply the operating parameters and/or to provide the recommended operating parameters to equipment personnel, who may apply the prescribed operating parameters to the equipment during operation of the equipment.

For discussion purposes, some example implementations are described in the environment of a computing device that determines an operating envelope, such as for controlling operation of equipment and/or for providing information to equipment personnel associated with the equipment. However, implementations herein are not limited to the particular examples provided, and may be extended to other types of equipment, other types of environments, other system architectures, and so forth, as will be apparent to those of skill in the art in light of the disclosure herein. For instance, the techniques herein may be applied to numerous different types of equipment such as mining industry equipment e.g., drills, excavators, haul trucks, etc., as well as other types of equipment such as elevators, factory lines, construction machines, vehicles, manufacturing equipment, robotic equipment, refining equipment, and so forth.

FIG. 1 illustrates an example architecture of a system 100 able to control equipment based on a prescribed operating envelope and/or provide a recommendation or other communication based on the prescribed operating envelope according to some implementations. The system 100 includes a least one computing device 102 that is able to communicate directly or indirectly with one or more sensors 104, such as through one or more networks 106. For instance, the sensors 104 may be associated with equipment 108 for measuring one or more metrics of the equipment 108. Additionally, while one equipment 108 and associated sensors 104 are illustrated in this example, in other examples, there may be any number of equipment 108 and associated sensors 104 able to communicate with the computing device 102.

In some examples, the computing device 102 may include one or more servers, personal computers, embedded processors, or other types of computing devices that may be embodied in any number of ways. For instance, in the case of a server, the applications, modules, other functional components, and at least a portion of data storage may be implemented on at least one server, such as in a cluster of servers, a server farm or data center, a cloud-hosted computing service, and so forth, although other computer architectures may additionally or alternatively be used. Further, the computing device 102 may be able to communicate through the one or more networks 106 with one or more user computing devices 110.

In the illustrated example, the computing device 102 includes, or may have associated therewith, one or more processors 112, one or more communication interfaces 114, and one or more computer-readable media 116. Each processor 112 may be a single processing unit or a number of processing units, and may include single or multiple computing units, or multiple processing cores. The processor(s) 112 can be implemented as one or more central processing units, microprocessors, microcomputers, microcontrollers, digital signal processors, state machines, logic circuitries, and/or any devices that manipulate signals based on operational instructions. For instance, the processor(s) 112 may be one or more hardware processors and/or logic circuits of any suitable type specifically programmed or configured to execute the algorithms and processes described herein. The processor(s) 112 may be configured to fetch and execute computer-readable instructions stored in the computer-readable media 116, which can program the processor(s) 112 to perform the functions described herein.

The computer-readable media 116 may include volatile and nonvolatile memory and/or removable and non-removable media implemented in any type of technology for storage of information such as computer-readable instructions, data structures, program modules, or other data. For example, the computer-readable media 116 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device 102, the computer-readable media 116 may be a tangible non-transitory medium to the extent that, when mentioned, non-transitory computer-readable media exclude media such as energy, carrier signals, electromagnetic waves, and/or signals per se. In some cases, the computer-readable media 116 may be at the same location as the computing device 102, while in other examples, the computer-readable media 116 may be partially remote from the computing device 102.

The computer-readable media 116 may be used to store any number of functional components that are executable by the processor(s) 112. In many implementations, these functional components comprise instructions or programs that are executable by the processor(s) 112 and that, when executed, specifically program the processor(s) 112 to perform the actions attributed herein to the computing device 102. Functional components stored in the computer-readable media 116 may include a management application 118. The management application 118 may include one or more computer programs, computer-readable instructions, executable code, or portions thereof that are executable to cause the processor(s) 112 to perform various tasks, such as for determining a prescribed operation envelope for the target equipment 108, monitoring and controlling the target equipment 108, and sending communications to the user computing device 110 and/or to maintenance personnel, equipment operators, or other equipment personnel 120. In the illustrated example, the management application 118 includes a data preparer 122 for preparing historical data 124 for processing, an operation mode detector 126 for detecting an operation mode of the equipment 108, a feature generator 128 for determining features for machine learning, and an operating envelope generator 130 for generating operating envelope information 132 for one or more prescribed operating envelopes for the equipment 108 and/or other equipment (not shown in FIG. 1).

Each of these functional components 122, 126, 128, and 130 may be an executable module of the management application 118, or a portion thereof. Alternatively, in other examples, some or all of these components 122, 126, 128, and 130 may be separately executable computer programs. Additionally, the functional components in the computer-readable media 116 may include an operating system 134 that may control and manage various functions of the computing device 102. In some cases, the functional components may be stored in a storage portion of the computer-readable media 116, loaded into a local memory portion of the computer-readable media 116, and executed by the one or more processors 112. Numerous other software and/or hardware configurations will be apparent to those of skill in the art having the benefit of the disclosure herein.

In addition, the computer-readable media 116 may store data and data structures used for performing the functions and services described herein. For example, the computer-readable media 116 may store the operating envelope information 132 and the historical data 124, which may include historical sensor data 136 and historical failure data 138. For example, the historical failure data 138 may include failure reports 140 previously received from the equipment 108, the user computing device(s) 110, and/or the equipment personnel 120. In addition, the computer-readable media 116 may store a machine learning model 142, as discussed additionally below. As one example, the operating envelope generator of the management application 118 may use the machine learning model 142, the historical sensor data 124, and the historical failure data 138 to determine the operating envelope information 132. Any newly received failure reports 140 are stored in the historical failure data 138, and any newly received sensor data 144 may be stored in the historical sensor data 136.

As discussed additionally below, the management application 118 may use the operating envelope information 132 to perform one or more actions, such as controlling the equipment 108 within the operating envelope, sending recommendations or other communications to the equipment personnel 120, such as at the user computing device 110, or the like. The computing device 102 may also include or maintain other functional components and data, which may include programs, drivers, etc., and other data used or generated by the functional components. Further, the computing device 102 may include many other logical, programmatic, and physical components, of which those described above are merely examples that are related to the discussion herein.

The communication interface(s) 114 may include one or more interfaces and hardware components for enabling communication with various other devices, such as over the one or more networks 106. Thus, the communication interfaces 114 may include, or may couple to, one or more ports that provide connection to the network(s) 106 for communicating with the sensor(s) 104, the equipment 108, and/or the user computing device(s) 110. For example, the communication interface(s) 114 may enable communication through one or more of a LAN (local area network), WAN (wide area network), the Internet, cable networks, cellular networks, wireless networks (e.g., Wi-Fi) and wired networks (e.g., fiber optic, Ethernet, Fibre Channel), direct connections, as well as close-range communications, such as BLUETOOTH®, and the like, as additionally enumerated below.

The one or more networks 106 may include any type of network, including a LAN, such as an intranet; a WAN, such as the Internet; a wireless network, such as a cellular network; a local wireless network, such as Wi-Fi; short-range wireless communications, such as BLUETOOTH®; a wired network including fiber optics, Ethernet, Fibre Channel, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the computing device 102, the sensor(s) 104 and/or the equipment 108, and the user computing device(s) 110 are able to communicate over the one or more networks 106 using wired or wireless connections, and combinations thereof.

In some examples, the computing device 102 may receive the sensor data 144 from the one or more sensors 104 that are associated with the equipment 108 for measuring one or more characteristics or other metrics of the equipment 108. For instance, the management application 118 may store the received sensor data 144 as part of the historical sensor data 136. Subsequently, the management application 118 may update the prescribed operating envelope for the equipment 108, taking into consideration the historical sensor data 136 including any sensor data 144 received since the last update of the prescribed operating envelope. In some cases, based on the determined operating envelope information 132, the management application 118 may send an operation signal 150 for controlling the equipment 108 directly according to the prescribed operating envelope.

Additionally, or alternatively, the management application 118 may send a communication 152 to the user computing device 110. As one example, the communication 152 may be sent, e.g., according to an application programming interface (API) to a user application 154 on the user computing device 110. For instance, the user application 154 on the user computing device 110 may control, at least partially, the operation of the equipment 108. In this case, the communication 152 may indicate one or more operating parameter values of the prescribed operation envelope for the equipment 108. Thus, the user application 154 on the at least one user computing device 110 may receive the communication 152, and may automatically apply the one or more prescribed operating parameter values to the equipment 108 for controlling the equipment 108 according to the prescribed operating envelope.

Additionally, or alternatively, in some examples, the communication 152 may include a recommendation for the prescribed operating envelope to inform the equipment personnel 120 regarding one or more operating parameter values or other settings for the equipment 108. For example, the user application 154 may present the received recommendation on a display 156 associated with the user computing device 110. In this scenario, the equipment personnel 120 may apply the recommended parameters manually or through the user computing device 110. Numerous other variations will be apparent to those of skill in the art having the benefit of the disclosure herein.

The sensor(s) 104 may monitor a single target equipment 108, or may monitor multiple pieces of equipment 108. The sensor(s) 104 may include the ability to communicate over the network 106 with the computing device 102, such as to send the sensor data 144 to the computing device 102. For instance, the sensor data 144 may include a received sensor signal plus a timestamp corresponding to the time at which the sensor data was sensed. In some cases, the sensor(s) 104 or a device associated therewith may include a hardware configuration similar to that described for the computing device 102, but with different functional components and data to enable the sensor(s) 104 to perform the various measurement and communication functions discussed herein.

In other examples, the sensor(s) 104 may be integrated into the equipment 108, the equipment 108 may communicate directly with the computing device 102, and the computing device 102 may communicate directly with the equipment 108. In this case, the management application 118 may receive the sensor data 144 from the equipment 108.

The user computing device(s) 110 may be any suitable type of computing devices such as a desktop, workstation, server, laptop, tablet computing device, mobile device, smart phone, wearable device, or any other type of computing device able to send and receive data over a network. In some cases, the user computing device 110 may include hardware configurations similar to that described for the computing device 102, but with different data and functional components, such as the user application 154, to enable the user computing device 110 to perform the various functions discussed herein. In some examples, the user computing device 110 may include the display 156 such as for presenting a communication 152 received from the management application 118. For instance, the communication 152 may provide the equipment personnel 120 with one or more recommendations for operation of the equipment 108. Furthermore, the equipment personnel 120 may use the user computing device 110 to enter a failure report 140 regarding the equipment 108 to send to the computing device 102. Alternatively, in other examples, the equipment 108 may be configured to send a failure report 140 to the computing device 102. As still another example, the user application 154 may be configured to send a failure report 140 to the computing device 102. For example, the failure report 140 may include a failure code indicative of a type or other category of the failure, an identifier (equipment ID) of the equipment 108, a time at which the failure occurred, a time that the equipment 108 was repaired, brought back online, or otherwise began to operate normally again. In some examples, two failure reports 140 may be sent to the computing device 102, e.g., a first failure report 140 that indicates when failure has occurred, and a second in failure report 140 that indicates when the equipment 108 has been repaired or otherwise begins operating normally again.

Additionally, in some examples, a portion of the operations described herein may be performed by a first one of the computing devices 102 that is remote from the equipment 108, and another portion of the operations may be performed by a second one of the computing devices 102 that is co-located with or included in the equipment 108. As one example, the first computing device 102 may be a server, personal computer, or the like, and the second computing device 102 may be an embedded computing device, such as an electronic control unit (ECU), or the like, that may control the equipment 108 directly according to the prescribed operating envelope. Numerous other variations will be apparent to those of skill in the art having the benefit of the disclosure herein.

FIG. 2 illustrates an example data structure 200 representative of historical sensor data according to some implementations. In this example, the data structure 200 is a table that includes an equipment ID 202, such as an identifier of the monitored equipment, a timestamp 204 corresponding to a time at which the sensor data was received, and sensor values 206-208 of one or more sensors for sensor measurements corresponding to the timestamp 204. For instance, a first sensor value 206 and an Nth sensor value 208 are illustrated, but there may be any number of sensor values for the one or more sensors. Each row 210, 212, 214, and 216 corresponds to a particular timestamp 204 and a particular equipment ID 206. The timestamp 204 may indicate the date and time at which the sensor data was received by the computing device 102 or, alternatively, recorded or sent by the sensor(s) 104.

FIG. 3 illustrates an example data structure 300 representative of historical failure data according to some implementations. In this example, the data structure 300 is a table that includes an equipment ID 302, such as an identifier of the monitored equipment, a failure start time 304, a failure end time 306, and a failure code 308. Each row 310, 312, 314, and 314 corresponds to a different failure occurrence. The start time 304 may correspond to the date and time at which the failure occurred and the end time 306 may correspond to when the equipment was repaired or otherwise began operating normally again. As mentioned above, in some cases, a first failure report may be sent when the failure occurs and a second failure report may be sent when the equipment is back online or otherwise operational. In this case, the end time may be added to the respective row after the equipment becomes operational again. In other examples, the entire failure report might not be sent to the computing device 102 until the equipment has returned to operation.

Further, the failure code 308 may indicate what kind of failure the equipment suffered. Thus, in this example each different code may correspond to a different category of failure for the equipment. In other examples, rather than using a code, or in addition to using a code, a description of the failure category may be provided. As discussed additionally below, operating envelope generator may use the historical failure report information and the historical sensor information in a machine learning model, such as a decision tree, which may then be used for determining one or more operating parameter values for an operating envelope for the equipment.

Figure 4:
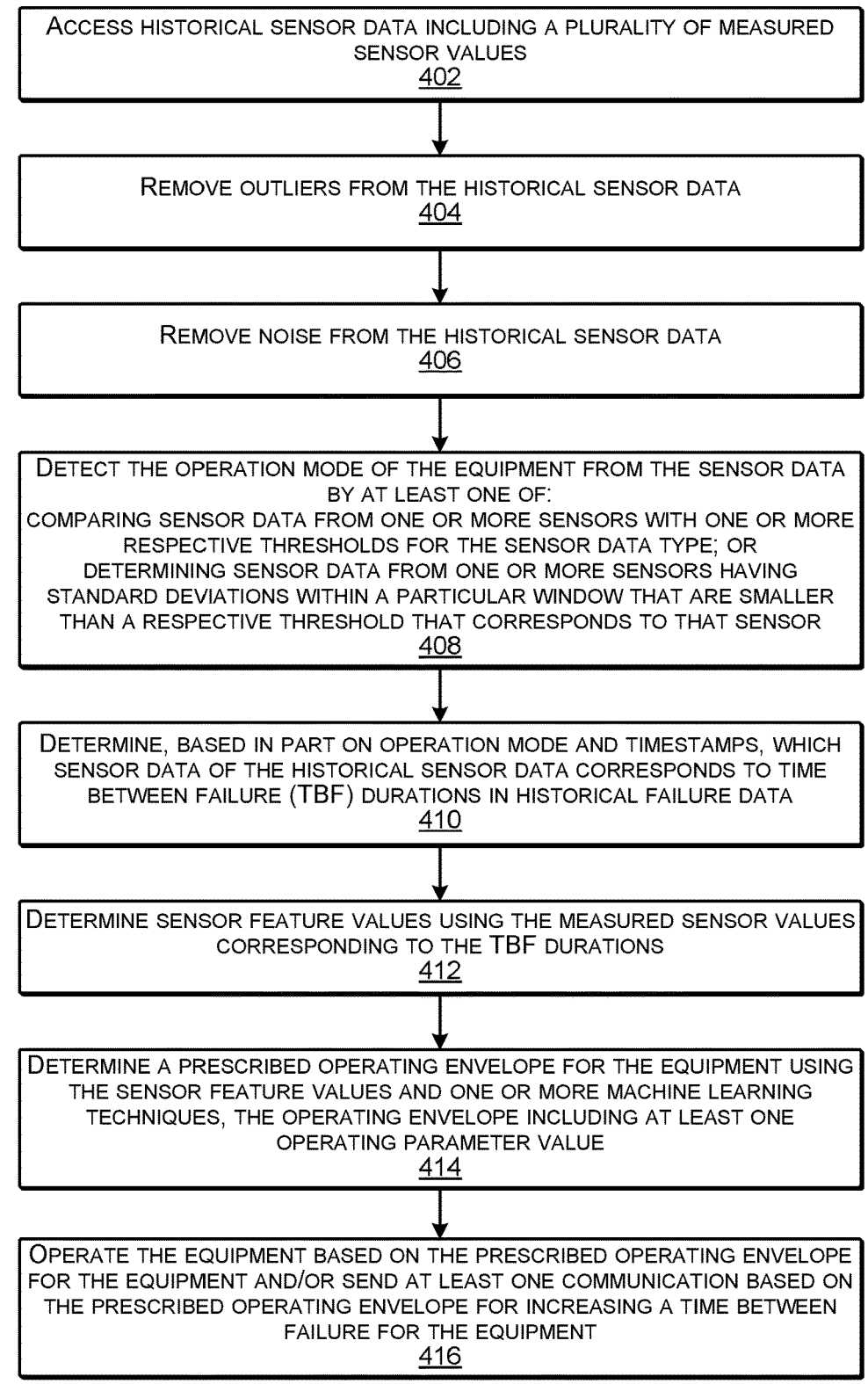
FIG. 4 is a flow diagram illustrating an example process for generating a prescribed operating envelope for controlling equipment according to some implementations.
Figure 6:
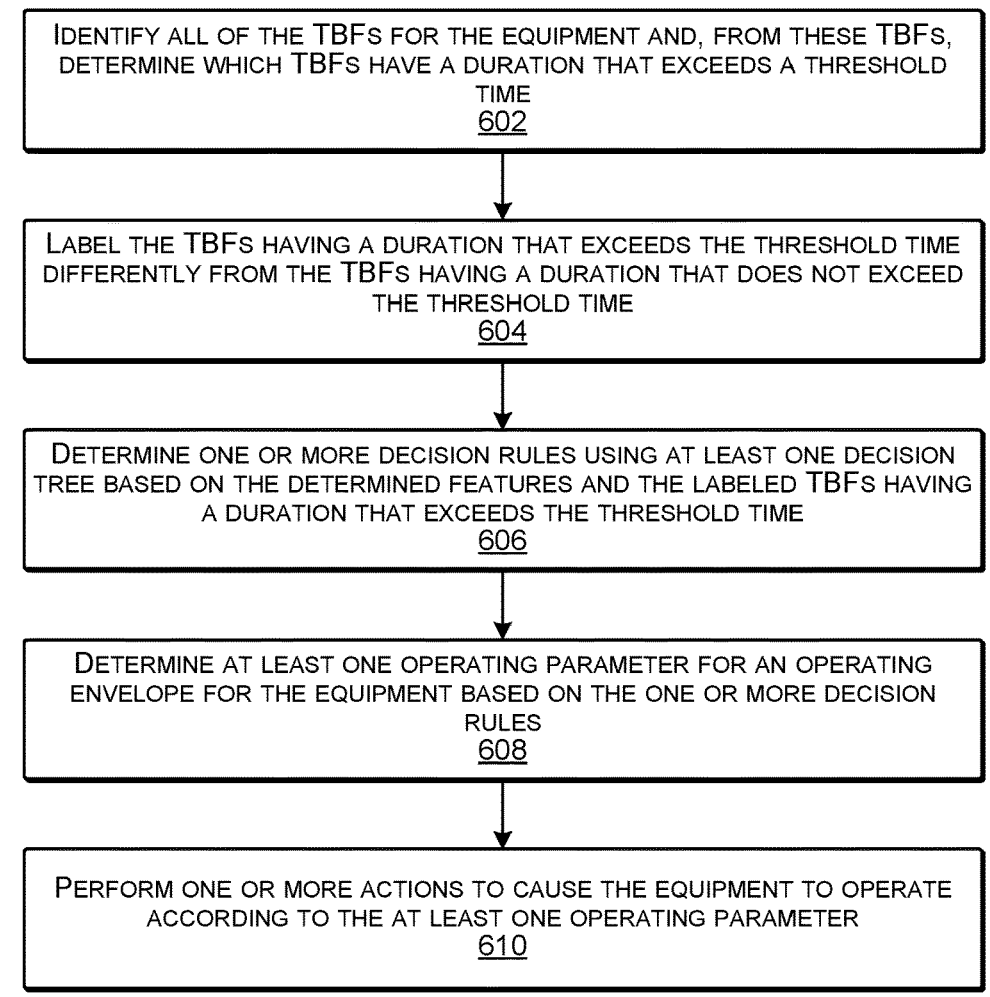
FIG. 6 is a flow diagram illustrating an example process for determining an operating envelope based in part on determined sensor values corresponding to the time between failures according to some implementations.

FIGS. 4 and 6 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 4 is a flow diagram illustrating an example process 400 for generating a prescribed operating envelope for controlling equipment according to some implementations. In some examples, one or more components of the management application 118 discussed above with respect to FIG.

1 may be executed by the one or more processors of the computing device 102 to cause the computing device 102 to perform this process.

At 402, the computing device may access the historical sensor data. For example, the historical sensor data may have been received over a period of time from sensors associated with the equipment. Additionally, in some examples, the historical sensor data may have been received from sensors associated with other pieces of equipment that are categorized as being sufficiently similar to the equipment such that the same operating parameters may be applied for achieving the same result. In some examples, the data preparer of the management application discussed above with respect to FIG. 1 may be executed by the one or more processors of the computing device 102 to perform this operation.

At 404, the computing device may remove outliers from the historical sensor data. For example, the computing device may use any of a variety of known algorithms for removing outliers. As one example, the data may be divided into quartiles based on data values, and the interquartile range (IQR) determined based on the distance between the third quartile Q3 and the first quartile Q1 (i.e., Q3−Q1), which contains the middle 50% of the data. Outliers may then be defined as any values that fall outside of: Q1− (1.5*IQR) and/or Q3+(1.5*IQR). Numerous other techniques for identifying and removing outliers from the historical sensor data will be apparent to those of skill in the art. In some examples, the data preparer of the management application discussed above with respect to FIG. 1 may be executed by the one or more processors of the computing device 102 to perform this operation.

At 406, the computing device may remove noise from the historical sensor data. For example, the computing device may use any of a variety of known algorithms for removing noise. Examples include linear smoothing filters, anisotropic diffusion, nonlinear filters, and statistical methods. Numerous other techniques for identifying and removing noise from the historical sensor data will be apparent to those of skill in the art. In some examples, the data preparer of the management application discussed above with respect to FIG. 1 may be executed by the one or more processors of the computing device 102 to perform this operation.

At 408, the computing device may detect the operation mode of the equipment from the sensor data by at least one of: comparing sensor data from one or more sensors with one or more respective thresholds for the sensor data type; or determining sensor data from one or more sensors having standard deviations within a particular window that are smaller than a respective threshold that corresponds to that sensor. In some examples, the operation mode detector of the management application discussed above with respect to FIG. 1 may be executed by the one or more processors of the computing device 102 to perform this operation. Accordingly, the operation mode detector may determine the operation mode of the equipment for different parts of the historical sensor data. For example, the equipment may have some operation modes such as "ON mode", "OFF mode", "Low mode", "High mode", etc. In some examples, the prescribed operating envelope is constructed by using a particular operation parameter value corresponding to a particular operation mode. For instance, in some types of equipment it may not be possible to vary an operating parameter value with fine granularity, as the equipment may have fixed operating modes, e.g., just low speed or high speed, rather than being able to control the speed to any desired speed. In some cases, the operation mode of the equipment may correspond to an operation parameter value, which may indicate a particular speed setting, a revolutions per minute (RPM) range, a capacity limitation, a power setting, an operating temperature setting, and so forth. The operation mode detector of FIG. 1 may determine particular operation modes of the equipment for particular measured sensor values using either or both of the following techniques, or other techniques.

As a first example of mode detection, the operation mode detector may select a particular piece (or multiple pieces) of sensor data for determining the operation mode of the equipment at the time that the sensor measurement was taken. The operation mode detector compares the measured sensor value(s) with one or more thresholds indicative of the corresponding operation mode. For example, suppose that a measured sensor value is 100 RPM. Furthermore, suppose that a threshold value for the equipment is 90 RPM, such that an RPM above 90 indicates a high speed mode, and an RPM below 90 indicates a lower speed mode. Accordingly, based on the sensor value exceeding the threshold, the operation mode detector may determine that the equipment was in the high-speed mode at the time that the sensor value was taken. Additionally, if the prescribed operating envelope for the equipment includes a prescribed operating parameter value of 105 RPM, the prescribed operating envelop may include operating the equipment in the high-speed mode since there may not be a control on the equipment for controlling the RPM more precisely.

As a second example of mode detection, the operation mode detector may select a particular piece of sensor data (or multiple pieces of sensor data) over a time window for determining the operation mode of the equipment at the time that the sensor measurement was taken. The operation mode detector determines a standard deviation of the sensor data over the particular time window and compares the standard deviation for the data with a threshold standard deviation for the sensor for the equipment. For example, suppose that in a first operating condition, the equipment causes a sensor measurement of the particular sensor to have a standard deviation of 4.0 over a five hour period, whereas in a second operating condition of the equipment, the sensor measurements of the sensor may have a standard deviation of only 1.0 over a five hour period. Accordingly, the operation mode detector may compare the standard deviation over the time window with a threshold standard deviation, e.g., 2.0, such that if the standard deviation is over 2.0, the first operating condition is selected and if the standard deviation is less than 2.0, the second operating condition is selected for the sensor data being examined. Furthermore, while several techniques for determining the operation mode of the equipment from the sensor data are discussed above, numerous other examples will be apparent to those of skill in the art having the benefit of the disclosure herein.

At 410, the computing device may determine, based in part on the identified operation mode and corresponding timestamps associated with the sensor data, which of the sensor data of the historical sensor data corresponds to the time between failure (TBF) durations determined from the historical failure data. For example, the equipment may be operated differently at different times, which may cause failure more frequently or less frequently.

At 412, the computing device may determine sensor value features, i.e., measured sensor values over time from the historical sensor data values corresponding to the TBF durations. Additional details of this process are discussed below, e.g., with respect to FIGS. 5-7.

Figure 5:
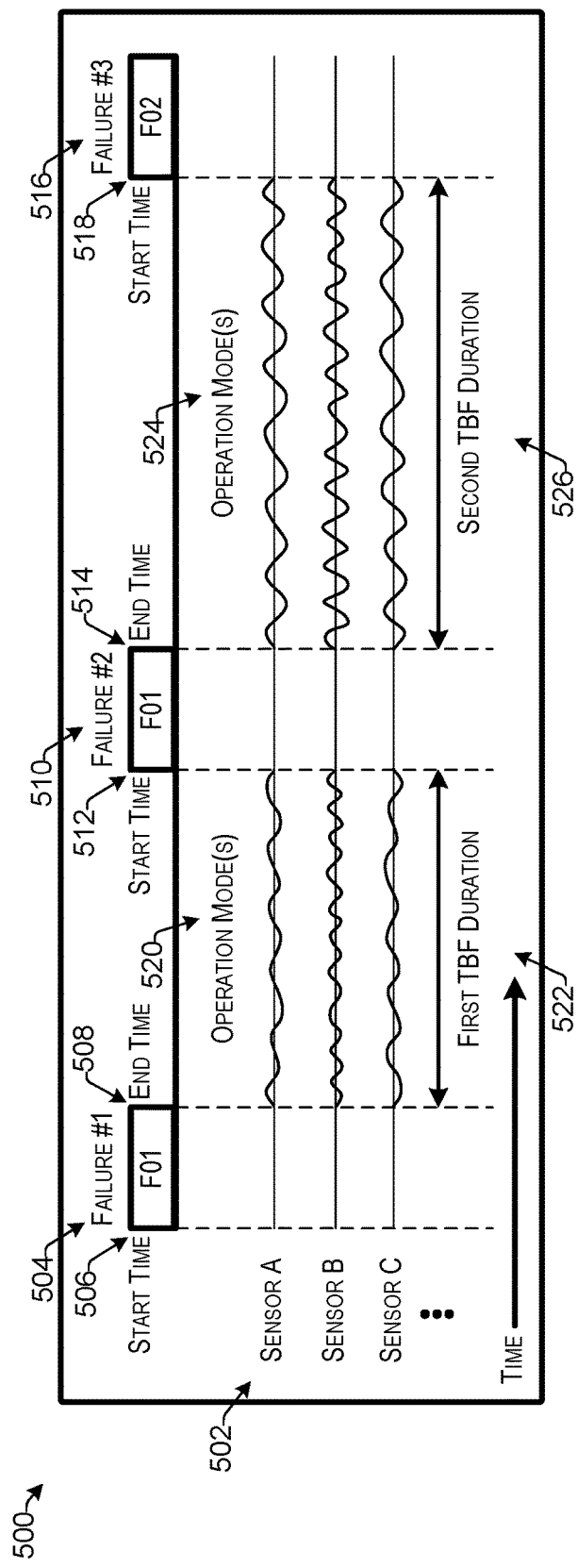
FIG. 5A illustrates an example graph of failure occurrences and operation modes for time between failures according to some implementations.
FIG. 5B illustrates an example data structure including features determined from the historical sensor data according to some implementations.

At 414, the computing device may create a prescribed operating envelope for the equipment using the determined sensor features based on one or more machine learning techniques such as a decision tree, regression analysis, or other machine learning technique as discussed below e.g. with respect to FIGS. 5-7.

At 416, the computing device may control or otherwise operate the equipment based on the prescribed operating envelope for the equipment and/or may send at least one communication based on the prescribed operating envelope for increasing a time between failure for the equipment. In some cases, based on the determined prescribed operating envelope, the management application may send one or more operation signals for controlling the equipment directly according to the prescribed operating envelope. The operation signal may control or may cause control of the equipment hardware, such as for adjusting the settings of the equipment directly, e.g., for controlling the speed of operation, the timing of operation, or other operating parameters of the equipment. As one example, such as in the case of drilling equipment, the operation signal may control the speed of rotation of the drill bit, the speed of advancement of the drill into the earth, as well as other parameters such as fluid flow to the drill bit, variations in speed, and the like. In other examples, the operation signal may make a change to software of the equipment such that the changed software controls the equipment according to the prescribed operating envelope. Thus, the management application herein may manage the operation of the equipment for decreasing the likelihood that the equipment will be subject to a failure.

Additionally, or alternatively, as discussed above, the management application may send a communication to the user computing device, such as to a user application executing on the user computing device. As one example, the user application on the user computing device may control, at least partially, the operation of the equipment. In this case, the communication from the management application may indicate one or more operating parameter values of the prescribed operation envelope for the equipment. Thus, the user application on the user computing device may receive the communication, and may automatically apply the one or more prescribed operating parameters to the equipment for controlling the equipment according to the prescribed operating envelope.

As still another alternative, in some examples, the communication may include a recommendation for the prescribed operating envelope to inform the equipment personnel regarding one or more settings or other operating parameter values for the equipment. For example, the user application on the user computing device may present the received recommendation on a display associated with the user computing device. In this case, the equipment personnel may apply the recommended operating parameter value(s) manually or through the user computing device to cause the equipment to operate according to the prescribed operating envelope with a decreased likelihood of failure, thereby improving the operation of the equipment over a lifetime of the equipment. Numerous other variations will be apparent to those of skill in the art having the benefit of the disclosure herein.

FIGS. 5A and 5B illustrate an example of determining sensor value features from historical sensor data according to some implementations. In some implementations, the example of FIGS. 5A and 5B may correspond to operations of blocks 410 and 412 discussed above with respect to FIG. 4. In this example, the feature generator of the management application may create sensor value features from the historical sensor data based on the determined operation mode during the time between failures.

FIG. 5A illustrates an example graph 500 of failure occurrences and operation modes between failures according to some implementations. In this example, the measured sensor values from the historical sensor data for one or more sensors 502 may be used to determine an operation mode of the equipment corresponding to the measured sensor values of the one or more sensors 502. For instance, the operation mode for various settings of the equipment may be determined as discussed above with respect to FIG. 4. As one example, suppose that sensor A corresponds to a first operating parameter of the equipment, sensor B may correspond to a second operating parameter of the equipment, sensor C may correspond to a third operating parameter of the equipment, and so forth. As a concrete example, suppose that the equipment is a drill, and that sensor A corresponds to a speed of shaft rotation, sensor B corresponds to a speed of shaft advancement into the earth, and sensor C corresponds to an amount of fluid delivery to the drill bit. As another example, suppose that the equipment is a factory line and that sensor A corresponds to a conveyor belt speed, sensor B corresponds to an angle of the conveyor, and sensor C corresponds to an amount of material added to the conveyor per unit of time. Numerous other applications will be apparent to those of skill in the art, with the sensed operating parameters depending on the type of equipment to which the implementations herein are applied.

The graph 500 of FIG. 5A further illustrates the timing of a first failure occurrence 504, including a start time 506 and end time 508 for the first failure, and a failure code F01; a second failure occurrence 510, including a start time 512 and end time 514 for the second failure, and a failure code F01; and a third failure occurrence 516, including a start time 518 for the third failure, and a failure code F02. The operation mode(s) 520 of the equipment corresponding to each of the sensors 502 may have been determined as discussed above with respect to FIG. 4 over a first TBF duration 522 between the end time 508 of the first failure and the start time 512 of the second failure. In addition, the operation mode(s) 524 of the equipment corresponding to each of the sensors 502 may have been determined over a second TBF duration 526 between the end time 514 of the second failure and the start time 512 of the second failure. Thus, the TBF durations 522 and 526 are the times between failures during which the equipment is operating normally, and the operation modes 520 and 524 of the equipment may be determined for the TBF durations based on the measured sensor values for each of sensors A, B, and C. In some examples, the failure information for the graph 500 may be determined from the historical failure data as discussed above with respect to FIGS. 1 and 3.

FIG. 5B illustrates an example data structure 540 including sensor value features determined over the respective TBF duration from the historical sensor data according to some implementations. In this example, the feature generator calculates sensor value features from the sensor data corresponding to the first TBF duration 522 and the second TBF duration 526. For instance, the features may be one of, or combinations of, an average value of the measured sensor data values for each sensor averaged over the respective TBF duration, a standard deviation of the measured sensor values over the respective TBF duration, a maximum value of the measured sensor values over the respective TBF duration, a minimum value of the measured sensor values over the respective TBF duration and/or a percentile of the measured sensor values over the respective TBF duration.

As an example, suppose that sensor A corresponds to the rotational speed of a shaft and that sensor A measured the rotational speed as varying between 99 and 101 RPM over the first TBF duration 522. Accordingly, the feature generator may take the average of the measured sensor A values over the first operation duration 522, which may provide a result of 100 RPM as the average measured sensor value for sensor A over the first TBF duration 522. Other features for the other sensors may be similarly determined depending on the type of sensor and the equipment operating parameter being sensed by the particular sensor.

The data structure 540 includes a duration identifier 542, a start time 544 of the TBF duration, an end time 546 of the TBF duration, the TBF duration 548, and determined sensor value features 550. For instance, the start time 544 may correspond to the end time of a corresponding failure from FIG. 5A, e.g., in the case of the first TBF duration of 7 days, 0 hours, the start time 544 may correspond to the end time 508 of the first failure 504. Similarly, in the case of the first TBF duration, the end time 546 of the first operation duration may correspond to the start time 512 of the second failure 510. Accordingly, for each of the TBF durations, the feature generator may generate one or more of the determined sensor value features 550 corresponding to each of the sensors A, B, and C.

FIG. 6 is a flow diagram illustrating an example process 600 for determining an operating envelope based in part on the determined sensor value features corresponding to the TBF durations according to some implementations. In some examples, one or more components of the management application 118 discussed above with respect to FIG. 1 may be executed by the one or more processors of the computing device 102 to cause the computing device 102 to perform this process.

At 602, the computing device may identify all the TBFs for the equipment and, from these TBFs, may determine which TBFs have a duration that exceeds a threshold length of time. As mentioned above, the TBF durations may be determined from the historical failure data for the equipment.

At 604, the computing device may label the TBF durations that exceed the threshold time differently from the TBF durations that do not exceed the threshold time. As one non-limiting example, if the duration of a particular TBF duration is greater than the threshold length of time, this particular TBF duration may be defined with a first label, e.g., "1". Otherwise, the particular TBF duration may be defined with a second label e.g., "0". Furthermore, one example of a method to define the threshold length of time is to use the top X percent of the TBF durations having the longest durations.

At 606, the computing device may determine one or more decision rules with a decision tree(s) based on the determined features and the labeled TBF durations. The decision rules may provide an indication of one or more operating parameter values for the equipment that may be included in the prescribed operating envelope for the equipment. An example of creating a decision tree and the determination of a decision rule/operating parameter value is discussed additionally below with respect to FIG. 7.

At 608, the computing device may create a prescribed operating envelope for the equipment based on one or more determined decision rules. For instance, the prescribed operating envelope may include one or more operating parameter values determined from the decision tree(s). Additional details of creating the prescribed operating envelope are discussed below, e.g., with respect to FIGS. 7-10.

At 610, the computing device may perform one or more actions to apply the prescribed operating envelope to the equipment. For example, the process 600 of FIG. 6 may be part of the process 400 of FIG. 4, and any of the actions discussed at block 416 may be performed, or various other actions, as will be apparent to those of skill in the art having the benefit of the disclosure herein.

Figure 7:
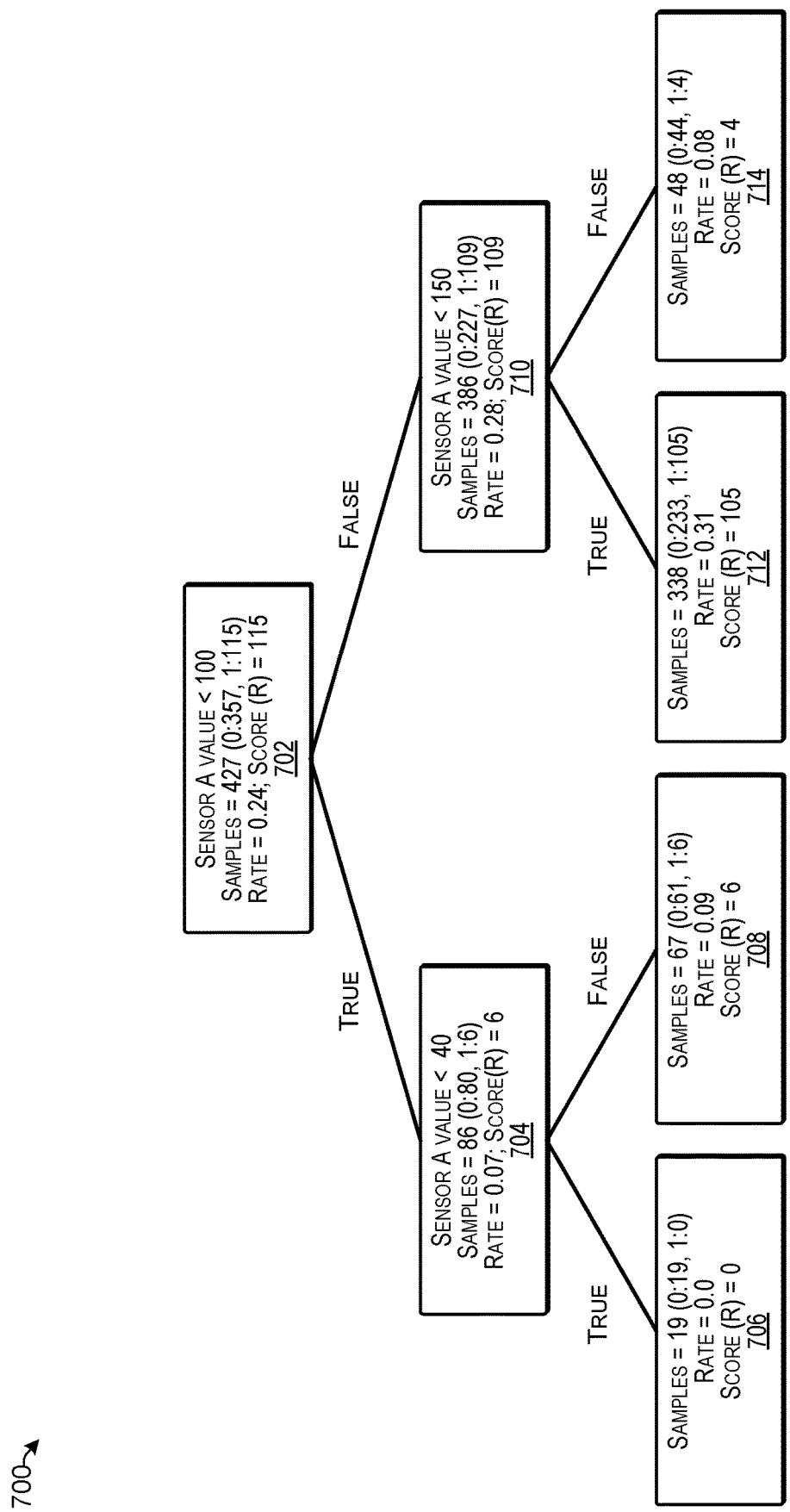
FIG. 7 illustrates an example decision tree that may be used for determining an operating parameter value according to some implementations.

FIG. 7 illustrates an example decision tree 700 that may be used by the operation envelope creator of the management application for determining a decision rule/operating parameter value according to some implementations. The decision tree 700 is an example of a supervised learning method that may be used for classification and regression analysis. For instance, the decision tree 700 represents a machine learning model that may be used to predict a value of a target variable by learning simple decision rules inferred from the sensor value features determined from the historical sensor data. The decision tree model may learn a series of questions to infer the class labels of samples. Using the decision tree model, implementations herein may start at the tree root and split data on the sensor value features, e.g., based on the Gini index. In a decision tree, the Gini Index may be used to compute the impurity of a data partition. For instance, the Gini index is a measure of how often a randomly chosen element from a set might be incorrectly labeled if it were randomly labeled according to the distribution of labels in the subset.

The splitting procedure may be repeated at each child node until the terminating nodes are "pure" or some predefined conditions are satisfied such as the maximum depth of the tree is reached. In some implementations, the number of decision tree models created may correspond to the number of sensor value features determined from the historical sensor data. In other implementations, a single decision tree may be created for multiple sensor value features. As one example, the decision trees herein may be implemented according to the following steps.

(1) When there are n data points, the $k^{th}$ label may be denoted as $y_k$ (k=1 ... n). Thus, $y_k$ may be determined based on the length of the $k^{th}$ TBF, $TBF_k$:

$$y_k = \begin{cases} 1 & \text{if } TBF_k > th \\ 0 & \text{else} \end{cases}$$

where th represents the predefined length of time threshold for the TBFs.

(2) For m features, the process may denote the $i^{th}$ feature by $x^i$ (i=1 ... m). In addition, $x^i$ has n data points. The decision tree model using m features may be denoted by F.

(3) Calculate r of each terminating node, where r is the fraction of samples whose TBF is greater than th.

$$r_j = \frac{1}{n_j} \sum_{k \in jth\ node} y_k$$

where $n_j$ represents the number of samples in $j^{th}$ terminating node, and $r_j$ represents r of $j^{th}$ terminating node.

(4) The terminating node J of the decision tree F, that has the maximum $r_j$ is selected.

$$J = \underset{j \in F}{\mathrm{argmax}}(r_j)$$

(5) The score R of J is calculated. R may be defined as a model performance index. When the score R is higher, the features used for creating the decision tree are better for use in the prescribed operating envelope.

$$R = \sum_{k \in J \text{ th node}} y_k$$

(6) Show the features and their decision rules (e.g., ranges) in a descending order from the higher scores for R to the lower scores.

The decision tree learning herein may use the decision tree as a predictive model of observations about the equipment, with the bottom layer (i.e., the leaves) of the tree representing the possible decisions, e.g., operating parameter values, to apply to the prescribed operation envelope. Each leaf may represent a value of a target variable given the values of the input variable(s) represented by the path from the root to the leaf. In the example of FIG. 7, the decision tree 700 is generated for one variable e.g., sensor A measured values in this example, for the sake of simplicity of explanation. However, decision trees herein may also be generated for multiple sensor/operating parameter variables, as discussed additionally below.

In the example of FIG. 7, a first node 702 of the decision tree 700 has a condition in which the value measured by sensor A is less than 100. Furthermore, in the first node 702, there are total of 437 TBF samples, the number of TBF samples labeled "0" is 357, and the number of TBF samples labeled "1" is 115. In other words, out of the total number of 427 TBF duration samples, the 115 TBF samples with durations that are the longest durations are labeled as "1" and the rest (i.e., the shorter 357 TBF durations) are labeled as "0". In addition, the rate indicates the number of samples labeled as "1" divided by the total number samples in the node, which in this case is rate=115/427=0.24. Further, the score (R) indicates the number of samples labeled as "1" in each node.

When classifying a particular sensor value for sensor A in the historical sensor data, if the sensor A value is less than 100, i.e., "true", the decision tree process goes to node 704 for determining whether the sensor A value is less than 40. If this is also true, the decision result is node 706, and if false, the decision result is node 708. Similarly, if the sensor A value at node 702 is not less than 100, i.e., the result is "false", the process goes to node 710 to determine sensor A values less than 150. When the sensor A value is greater than or equal to 100 but less than 150, the decision result is node 712, and if the sensor A value is greater than or equal to 150, the decision result is node 714.

Figure 8:
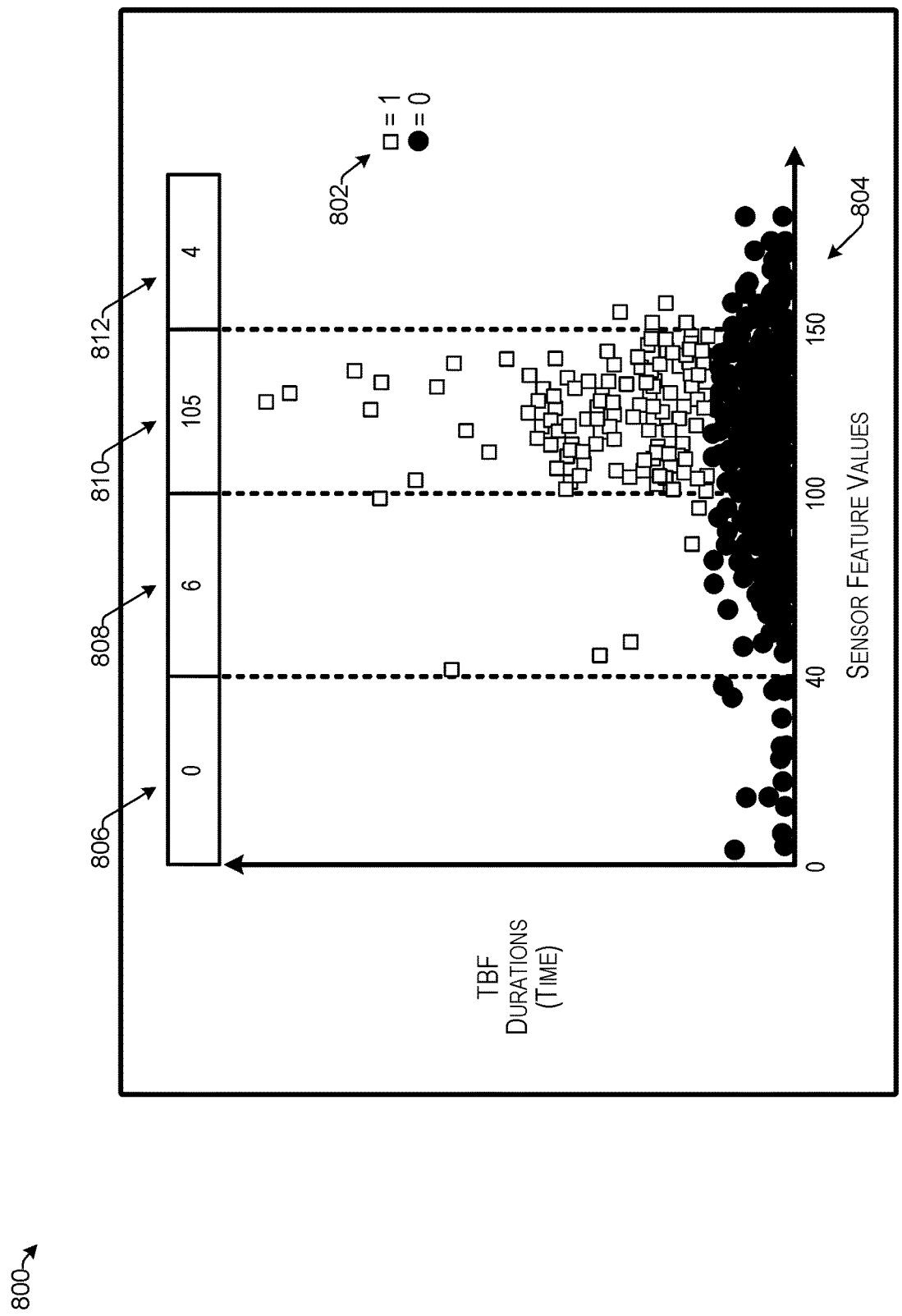
FIG. 8 is an example graph illustrating a relationship between TBF duration values and sensor values for the decision tree of FIG. 7 according to some implementations.

FIG. 8 is an example graph 800 illustrating a relationship between the TBF durations and the sensor feature values for the decision tree 700 of FIG. 7 according to some implementations. The graph 800 shows the TBF mappings of the 427 TBF samples used in the decision tree 700. As indicated at 802, the TBF durations labeled "1" are represented by the white squares in the graph 800, while the TBF durations labeled "0" are represented by the black dots in the graph 800. Further, the graph is segmented into four segments 804 corresponding to the sensor A feature values for the four leaf nodes 706, 708, 712, and 714 in the decision tree 700. Further, the corresponding score (R) for each of the segments is illustrated in the graph 800, namely a score 806 having a value of 0 corresponding to a first segment, a score 808 having a value of 6 corresponding to a second segment, a score 810 having a value of 105 corresponding to a third segment, and a score 812 having a value of 4 corresponding to a fourth segment.

The graph 800 illustrates that the largest number of TBF durations having a duration greater than the threshold length of time correspond to the third segment in which the score=105, i.e., there are 105 of the TBF samples with the longest duration in the third segment, and the equipment parameter corresponding to sensor A has an operating parameter value between 100 and 150 as measured by sensor A for this segment. Thus, the decision tree is one technique for determining which sensor value range corresponds to the largest number of TBF durations that are the longest, i.e., greater than the threshold duration. By operating the equipment within the range between 100 and 150 for the equipment operating parameter corresponding to sensor A, the time between failures is likely to be increased. Accordingly, implementations herein may determine that the equipment parameter value for operating the equipment is between 100 and 150, and may include this equipment operating parameter value in a prescribed operating envelope for operating the equipment.

FIG. 9 illustrates an example data structure 900 that summarizes the results of the decision tree for determining a prescribed operating envelope according to some implementations. The example data structure 900 of FIG. 9 is based on the decision tree results of FIG. 7. Data structure 900 may be in the form of a table that includes an equipment operating condition or other operating parameter value 902 and a resulting score (R) 904 determined using the decision tree 700 of FIG. 7. The data structure 900 indicates that the highest score is obtained when the value measured by sensor A is between 100 and 150. This corresponds to the longest time between failure of the equipment, and therefore, the prescribed operating envelope may include operating the equipment to maintain the operating parameter measured by sensor A between 100 and 150 to maximize the time between failures.

FIG. 10A illustrates an example data structure 1002 indicating decision tree results for a single variable according to some implementations. As mentioned above, the example of FIG. 7 only includes one sensor/operating parameter variable, i.e., the measured sensor value for sensor A. This analysis showed that operating this parameter of the equipment between 100 and 150, as measured by sensor A, results in the longest time between failures, as indicated at 1004 by the highest score of 105.

FIG. 10B illustrates an example data structure 1010 of a prescribed operating envelope according to some implementations. The data structure 1010 includes an operating parameter 1012, a determined score (R) 1014, a range of operating parameter values 1016 for each operating parameter 1012, including a "from" value 1018 indicating a lower end of the range, and a "to" value 1020 indicating a higher end of the range for the particular operating parameter. In this example, a decision tree may be generated for each sensor variable (e.g., each corresponding to a different operating parameter) and the operating parameter value corresponding to the highest score (R) may be selected from each set of decision tree results. In this case, the scores (R) from each different sensor variable/operating parameter may further be ranked from highest to lowest. The higher scores (R) may indicate more important or otherwise influential operating parameter values to apply when operating the equipment. For example, if there is a conflict between RPM and operating temperature, and the score (R) for the RPM is higher than the score (R) for the operating temperature, then the RPM operating parameter value may take precedence over the temperature operating parameter value. Further, an increased TBF rate 1022 may indicate a predication of how much the time between failures may increase if the equipment is operated according to the corresponding prescribed operating parameter values. For instance, the increased TBF rate 1022 may be determined from the average of the TBF for the $j^{th}$ node divided by the total average TBF.

FIG. 11A illustrates an example data structure 1100 indicating results from applying two variables in a single decision tree according to some implementations. For instance, as mentioned above, a decision tree similar to that discussed above with respect to FIG. 7 may be constructed with multiple sensor feature variables. Using this technique, the decision tree may determine operating parameter values for increasing the time between failures for the equipment based on the Gini index. The maximum depth of the decision tree may be limited in some cases. As one example, suppose there are 10 sensor feature variables. By limiting the maximum depth to, e.g., 3, then 3 operating parameter values for operating the equipment are determined by the decision tree. Alternatively, if the decision tree is limited to a greater maximum depth, e.g., 5, then 5 operating parameters values for operating the equipment, rather than only 3, may be determined by the decision tree. Thus, the maximum depth contributes to complexity of the prescribed operating envelope. For instance, the deeper the decision tree, the more complex the operating envelope conditions. However, a greater maximum depth may also provide a greater improvement in the time between failure if it is possible to operate the equipment according to the prescribed operating parameter values. In some cases, the decision tree process may be iterated from a maximum depth of 1 to a maximum depth of e.g., 5 to provide different options for operating parameters to be controlled for a prescribed operating envelope for particular equipment. As one example, the maximum depth may be selected based on the ease of controlling multiple parameters when operating the particular equipment. Further, the use of the multidimensional decision tree does not require determination of one or two features in advance.

In the example of FIG. 11A, the data structure 1100 includes resulting scores (R) for the sensor A feature, as indicated at 1102, and the sensor B feature, as indicated at 1104. In this example, sensor B has three ranges, i.e., (−20)-30, 30-50 and 50+. For example, suppose that sensor B measures an operating temperature, or the like. There are twelve possible combinations of operating the equipment based on possible ranges of sensor A and sensor B. Accordingly, a decision tree may be constructed as discussed above with respect to FIG. 7 that results in twelve leaf nodes having resulting scores (R) corresponding to the twelve possible results indicated in the data structure 1006. Accordingly, based on the results of the decision tree, the highest score (R) may be selected, as indicated at 1106. This selection indicates that the sensor A parameter should be maintained between 100-150, and the sensor B parameter should be maintained between 30 and 50 to achieve the longest time between failure when operating the equipment. This technique may be used to construct a decision tree for any number of variables corresponding to any number of historical sensor measurements for a piece of equipment.

FIG. 11B illustrates an example data structure 1110 indicating a prescribed operating envelope according to some implementations. In this example, suppose that the decision tree process is iterated to at least a maximum depth of 3. Thus, the prescribed operating envelope in the data structure 1110 includes a maximum depth 1112, a score (R) 1114, an increased TBF rate 1116, and operating parameter values 1118. For example, at the third depth, the prescribed operating envelope includes operating parameter values for three different operating parameters, namely, an operating parameter corresponding to sensor A value ($value_{SA}$), an operating parameter corresponding to a sensor B value ($value_{SB}$), and an operating parameter corresponding to a sensor C value ($value_{SC}$). Accordingly, the prescribed operating envelope may include a listing of one or more equipment operation parameters, as indicated in the data structure 1110 for achieving a maximum time between failure of the equipment. For example, as indicated by the increased TBF rate 1116, operating the equipment according to the prescribed operating parameter values is predicted to increase the time between failures for the equipment by 51 percent, thus, considerably improving the operation of the equipment. Further, in some examples, the operation parameters may be correlated with one or more operation modes of the equipment, as discussed above, e.g., with respect to FIG. 4, which may be used or otherwise indicated, such as when applying an operation signal to the equipment and/or providing a recommendation to equipment personnel for operating the equipment.

The example processes described herein are only examples of processes provided for discussion purposes. Numerous other variations will be apparent to those of skill in the art in light of the disclosure herein. Further, while the disclosure herein sets forth several examples of suitable systems, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media maintaining executable instructions, which, when executed by the one or more processors, configure the one or more processors to perform operations for determining a plurality of operating parameter values for operating an equipment for maximizing a time-between-failure (TBF) duration for the equipment, the operations comprising:

determining, for the equipment, a subset of the TBF durations including a plurality of the TBF durations that are longer than other TBF durations for the equipment;

determining, from sensor data corresponding to operation of the equipment during the TBF durations of the subset of the TBF durations, a plurality of measured sensor values for the equipment from a plurality of different sensors, each different sensor measuring a different operating parameter of the equipment;

creating a plurality of decision trees, each respective decision tree corresponding to a different respective operating parameter of the plurality of operating parameters, each respective decision tree created based on the subset of TBF durations and respective measured sensor values of the plurality of different sensors, wherein each respective decision tree includes a plurality of nodes, and different ones of the nodes correspond to different measured sensor values of the plurality of measured sensor values of a respective one of the sensors corresponding to the respective decision tree, wherein a bottom layer of each respective decision tree includes a plurality of bottom nodes that each correspond to a respective operating parameter value for the respective operating parameter of the equipment for that respective decision tree, each bottom node including an associated score for each different operating parameter value for the respective operating parameter, the associated score indicative of a number of the TBF durations associated with that bottom node;

determining, for each decision tree of the plurality of decision trees, and for the bottom node having a highest associated score, a subset of the measured sensor values corresponding to the bottom node having the highest associated score;

determining a selected operating parameter value for each of the plurality of operating parameters for the equipment based on the subset of the measured sensor values corresponding to the bottom node having the highest associated score for each respective decision tree;

ranking the operating parameters for the equipment based on the respective scores of the selected operating parameter values determined from each of the respective decision trees in an order from higher to lower based on the respective scores;

determining an operating envelope prescribed for the equipment, the operating envelope including the plurality of selected operating parameter values for the plurality of respective operating parameters for operating the equipment; and sending at least one of a control signal or a communication based on the plurality of operating parameter values determined for the operating envelope for the equipment to cause the equipment to operate according to the plurality of operating parameter values specified in the operating envelope for the plurality of different operating parameters for the equipment, wherein, when operating the equipment according to the plurality of operating parameter values results in a conflict between two operating parameter values of the plurality of operating parameters, an operating parameter value of a first operating parameter having a higher score rank is prioritized for operation of the equipment over an operating parameter value for a second operating parameter having a lower score rank.

2. The system as recited in claim 1, wherein determining the operating parameter value for each bottom node comprises determining a range of values for the operating parameter value.

3. The system as recited in claim 1, the operations further comprising determining the operating parameter values for each bottom node based at least partially on determining a mode of operation of the equipment corresponding to the subset of measured sensor values, wherein determining the mode of operation comprises comparing the measured sensor values to at least one threshold value corresponding to the mode of operation.

4. The system as recited in claim 1, wherein the sensor data is received over a period of time during which the equipment is operated and stored by the one or more processors in the one or more non-transitory computer-readable media.

5. The system as recited in claim 4, the operations further comprising receiving, over the period of time, a plurality of failure reports, each failure report indicating a time at which a failure occurred and a time at which the equipment was operational again, wherein at least some of the sensor data or the failure reports are received for other equipment that is categorized as being similar to the equipment.

6. The system as recited in claim 1, wherein sending at least one of the control signal or the communication based on the at least one operating parameter value for the equipment comprises sending a communication including the plurality of operating parameter values to a computing device over a network.

7. A method for determining a plurality of operating parameter values for operating an equipment for maximizing a time-between-failure (TBF) duration for the equipment, the method comprising:

determining, by one or more processors, for the equipment, a subset of the TBF durations including a plurality of the TBF durations that are longer than other TBF durations for the equipment;

determining, from sensor data corresponding to operation of the equipment during the TBF durations of the subset of the TBF durations, a plurality of measured sensor values for the equipment from a plurality of different sensors, each different sensor measuring a different operating parameter of the equipment;

creating a plurality of decision trees, each respective decision tree corresponding to a different respective operating parameter of the plurality of operating parameters, each respective decision tree created based on the subset of TBF durations and respective measured sensor values of the plurality of different sensors, wherein each respective decision tree includes a plurality of nodes, and different ones of the nodes correspond to different measured sensor values of the plurality of measured sensor values of a respective one of the sensors corresponding to the respective decision tree, wherein a bottom layer of each respective decision tree includes a plurality of bottom nodes that each correspond to a respective operating parameter value for the respective operating parameter of the equipment for that respective decision tree, each bottom node including an associated score for each different operating parameter value for the respective operating parameter, the associated score indicative of a number of the TBF durations associated with that bottom node;

determining, for each decision tree of the plurality of decision trees, and for the bottom node having a highest associated score, a subset of the measured sensor values corresponding to the bottom node having the highest associated score;

determining a selected operating parameter value for each of the plurality of operating parameters for the equipment based on the subset of the measured sensor values corresponding to the bottom node having the highest associated score for each respective decision tree;

ranking the operating parameters for the equipment based on the respective scores of the selected operating parameter values determined from each of the respective decision trees in an order from higher to lower based on the respective scores;

determining an operating envelope prescribed for the equipment, the operating envelope including the plurality of selected operating parameter values for the plurality of respective operating parameters for operating the equipment; and sending at least one of a control signal or a communication based on the plurality of operating parameter values determined for the operating envelope for the equipment that causes, at least in part, the equipment to operate according to the plurality of operating parameter values specified in the operating envelope for the plurality of different operating parameters for the equipment, wherein, when operating the equipment according to the plurality of operating parameter values results in a conflict between two operating parameter values of the plurality of operating parameters, an operating parameter value of a first operating parameter having a higher score rank is prioritized for operation of the equipment over an operating parameter value for a second operating parameter having a lower score rank.

8. One or more non-transitory computer-readable media storing instructions that, when executed by one or more processors, program the one or more processors of a system to determine a plurality of operating parameter values for operating an equipment for maximizing a time-between-failure (TBF) duration for the equipment, the one or more processors further programmed to:

determine, for the equipment, a subset of the TBF durations including a plurality of the TBF durations that are longer than other TBF durations for the equipment;

determine, from sensor data corresponding to operation of the equipment during the TBF durations of the subset of the TBF durations, a plurality of measured sensor values for the equipment from a plurality of different sensors, each different sensor measuring a different operating parameter of the equipment;

create a plurality of decision trees, each respective decision tree corresponding to a different respective operating parameter of the plurality of operating parameters, each respective decision tree created based on the subset of TBF durations and respective measured sensor values of the plurality of different sensors, wherein each respective decision tree includes a plurality of nodes, and different ones of the nodes correspond to different measured sensor values of the plurality of measured sensor values of a respective one of the sensors corresponding to the respective decision tree, wherein a bottom layer of each respective decision tree includes a plurality of bottom nodes that each correspond to a respective operating parameter value for the respective operating parameter of the equipment for that respective decision tree, each bottom node including an associated score for each different operating parameter value for the respective operating parameter, the associated score indicative of a number of the TBF durations associated with that bottom node;

determine, for each decision tree of the plurality of decision trees, and for the bottom node having a highest associated score, a subset of the measured sensor values corresponding to the bottom node having the highest associated score;

determine a selected operating parameter value for each of the plurality of operating parameters for the equipment based on the subset of the measured sensor values corresponding to the bottom node having the highest associated score for each respective decision tree;

ranking the operating parameters for the equipment based on the respective scores of the selected operating parameter values determined from each of the respective decision trees in an order from higher to lower based on the respective scores;

determining an operating envelope prescribed for the equipment, the operating envelope including the plurality of selected operating parameter values for the plurality of respective operating parameters for operating the equipment; and send at least one of a control signal or a communication based on the plurality of operating parameter values determined for the operating envelop for the equipment to cause the equipment to operate according to the plurality of operating parameter values specified in the operating envelope for the plurality of different operating parameters for the equipment, wherein, when operating the equipment according to the plurality of operating parameter values results in a conflict between two operating parameter values of the plurality of operating parameters, an operating parameter value of a first operating parameter having a higher score rank is prioritized for operation of the equipment over an operating parameter value for a second operating parameter having a lower score rank.

9. The one or more non-transitory computer-readable media as recited in claim 8, wherein determining the operating parameter values comprises determining a range of values for the operating parameter values.

10. The one or more non-transitory computer-readable media as recited in claim 8, the operations further comprising determining the operating parameter values based at least partially on determining a mode of operation of the equipment corresponding to the subset of measured sensor values, wherein determining the mode of operation comprises comparing the measured sensor values to at least one threshold value corresponding to the mode of operation.

11. The method as recited in claim 7, wherein determining the operating parameter values comprises determining a range of values for the respective operating parameter values.

12. The method as recited in claim 7, further comprising determining the operating parameter values based at least partially on determining a mode of operation of the equipment corresponding to the subset of measured sensor values, wherein determining the mode of operation comprises comparing the measured sensor values to at least one threshold value corresponding to the mode of operation.

13. The method as recited in claim 7, further comprising detecting an operation mode of the equipment from at least a portion of the sensor data of the plurality of sensors by determining at least the portion of the sensor data from a subset of the sensors having standard deviations within a particular window and that are smaller than respective thresholds that correspond to respective sensors of the subset of sensors.

\* \* \* \* \*